(12) United States Patent
Bansal et al.

(10) Patent No.: US 10,924,404 B2
(45) Date of Patent: *Feb. 16, 2021

(54) MULTI-TENANT MIDDLEWARE CLOUD SERVICE TECHNOLOGY

(71) Applicant: MICROSOFT TECHNOLOGY LICENSING, LLC, Redmond, WA (US)

(72) Inventors: Deepak Bansal, Redmond, WA (US); Parveen Patel, Redmond, WA (US); Albert Greenberg, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 27 days.

This patent is subject to a terminal disclaimer.

(21) Appl. No.: 16/244,657

(22) Filed: Jan. 10, 2019

(65) Prior Publication Data

US 2019/0253352 A1 Aug. 15, 2019

Related U.S. Application Data

(63) Continuation of application No. 15/639,803, filed on Jun. 30, 2017, now Pat. No. 10,212,085, which is a continuation of application No. 15/013,968, filed on Feb. 2, 2016, now Pat. No. 9,705,796, which is a continuation of application No. 14/309,352, filed on Jun. 19, 2014, now Pat. No. 9,164,360, which is a
(Continued)

(51) Int. Cl.
*G06F 15/173* (2006.01)
*H04L 12/801* (2013.01)
*G06F 9/50* (2006.01)

(52) U.S. Cl.
CPC .......... *H04L 47/10* (2013.01); *G06F 9/5072* (2013.01); *G06F 9/5077* (2013.01)

(58) Field of Classification Search
CPC ....... H04L 47/10; G06F 9/5072; G06F 9/5077
See application file for complete search history.

(56) References Cited

U.S. PATENT DOCUMENTS

| | | | |
|---|---|---|---|
| 7,845,010 B2 * | 11/2010 | Fujimoto | G06F 11/327 713/165 |
| 8,387,110 B1 * | 2/2013 | Cooper | H04L 63/102 726/1 |
| 8,516,241 B2 | 8/2013 | Chang et al. | |

(Continued)

OTHER PUBLICATIONS

"Summon to Attend Oral Proceedings Issued in European Patent Application No. 13732760.7", dated Jul. 9, 2019, 9 Pages.

*Primary Examiner* — Thanh T Nguyen
(74) *Attorney, Agent, or Firm* — Workman Nydegger

(57) ABSTRACT

A system that includes multiple hosts, each running a plurality of virtual machines. The system may be, for example, a cloud computing environment in which there are services and a service coordination system that communicates with the hosts and with the services. The services include a middleware management service that is configured to maintain per-tenant middleware policy for each of multiple tenants. The middleware management service causes the middleware policy to be applied to network traffic by directing network traffic to a middleware enforcement mechanism. This middleware policy is per-tenant in that it depends on an identity of a tenant.

20 Claims, 6 Drawing Sheets

Related U.S. Application Data continuation of application No. 13/527,372, filed on Jun. 19, 2012, now Pat. No. 8,775,599.

(56) References Cited

U.S. PATENT DOCUMENTS

| | | | |
|---|---|---|---|
| 8,667,165 B2 * | 3/2014 | Brabson | H04L 41/0893 709/223 |
| 8,730,980 B2 | 5/2014 | Bagepalli et al. | |
| 8,904,511 B1 | 12/2014 | O'Neill et al. | |
| 9,208,032 B1 * | 12/2015 | McAlister | G06F 11/1435 |
| 9,344,380 B2 * | 5/2016 | Zhu | H04L 67/303 |
| 9,667,533 B2 * | 5/2017 | Rahamim | H04L 45/306 |
| 2011/0292792 A1 | 12/2011 | Zuo et al. | |
| 2017/0329991 A1 * | 11/2017 | Van Dyne | G06F 17/30528 |

* cited by examiner

MULTI-TENANT MIDDLEWARE CLOUD SERVICE TECHNOLOGY

CROSS-REFERENCE TO RELATED APPLICATIONS

This application is a continuation of U.S. patent application Ser. No. 15/639,803 filed on Jun. 30, 2017, which is a continuation of U.S. patent application Ser. No. 15/013,968 filed on Feb. 2, 2016, entitled "MULTI-TENANT MIDDLEWARE CLOUD SERVICE TECHNOLOGY," which issued as U.S. Pat. No. 9,705,796 on Jul. 11, 2017, which is a continuation of U.S. patent application Ser. No. 14/309,352 filed on Jun. 19, 2014, entitled "MULTI-TENANT MIDDLEWARE CLOUD SERVICE TECHNOLOGY," which issued as U.S. Pat. No. 9,264,360 on Feb. 16, 2016, which is a continuation of U.S. patent application Ser. No. 13/527,372 filed on Jun. 19, 2012, entitled "MULTI-TENANT MIDDLEWARE CLOUD SERVICE TECHNOLOGY," which issued as U.S. Pat. No. 8,775,599 on Jul. 8, 2014, wherein all of the foregoing are incorporated herein by reference in their entireties.

BACKGROUND

"Cloud computing" is a model for enabling ubiquitous, convenient, on-demand network access to a shared pool of configurable computing resources (e.g., networks, servers, storage, applications, and services). The shared pool of configurable computing resources can be rapidly provisioned via virtualization and released with low management effort or service provider interaction, and then scaled accordingly. A cloud computing model can be composed of various characteristics (e.g., on-demand self-service, broad network access, resource pooling, rapid elasticity, measured service, etc), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.). An environment that implements the cloud computing model is often referred to as a cloud computing environment.

Cloud computing may be multi-tenancy. In multi-tenant cloud computing architecture, the same software application services multiple tenants, but the software application keeps a logical partition of the data and configuration for each tenant. The data is protected for each tenant, and the application is configurable on a per-tenant basis.

BRIEF SUMMARY

At least one embodiment described herein relates to a system that includes multiple hosts, each running virtual machines. The system may be, for example, a cloud computing environment in which there are services and a service coordination system that communicates with the hosts and with the services.

The services include a middleware management service that is configured to maintain per-tenant middleware policy for each of multiple tenants. The middleware management service causes the middleware policy to be applied to network traffic by directing network traffic to a middleware enforcement mechanism that enforces middleware for the particular host that hosts the virtual machine corresponding to the network traffic. This middleware policy is per-tenant in that it depends on an identity of a tenant.

This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

In accordance with embodiments described herein, a system includes multiple hosts, each running virtual machines. The system may be, for example, a cloud computing environment in which there are services and a service coordination system that communicates with the hosts and with the services.

The services include a middleware management service that is configured to maintain per-tenant middleware policy for each of multiple tenants. The middleware management service causes the middleware policy to be applied to network traffic by directing network traffic to a middleware enforcement mechanism. For instance, the middleware enforcement mechanism may run on the particular host (e.g., as a virtual machine or perhaps as another host component that hosts the virtual machine corresponding to the network traffic). Alternatively or in addition, some or all of the middleware enforcement mechanism may run on a separate host, and/or perhaps external to any host (such as a separate service).

First, some introductory discussion regarding computing systems will be described with respect to FIG. 1. Then, embodiments of the system will be described with respect to FIGS. 2 through 6.

Computing systems are now increasingly taking a wide variety of forms. Computing systems may, for example, be handheld devices, appliances, laptop computers, desktop computers, mainframes, distributed computing systems, or even devices that have not conventionally been considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. The memory may take any form and may depend on the nature and form of the computing system. A computing system may be distributed over a network environment and may include multiple constituent computing systems.

Figure 1:
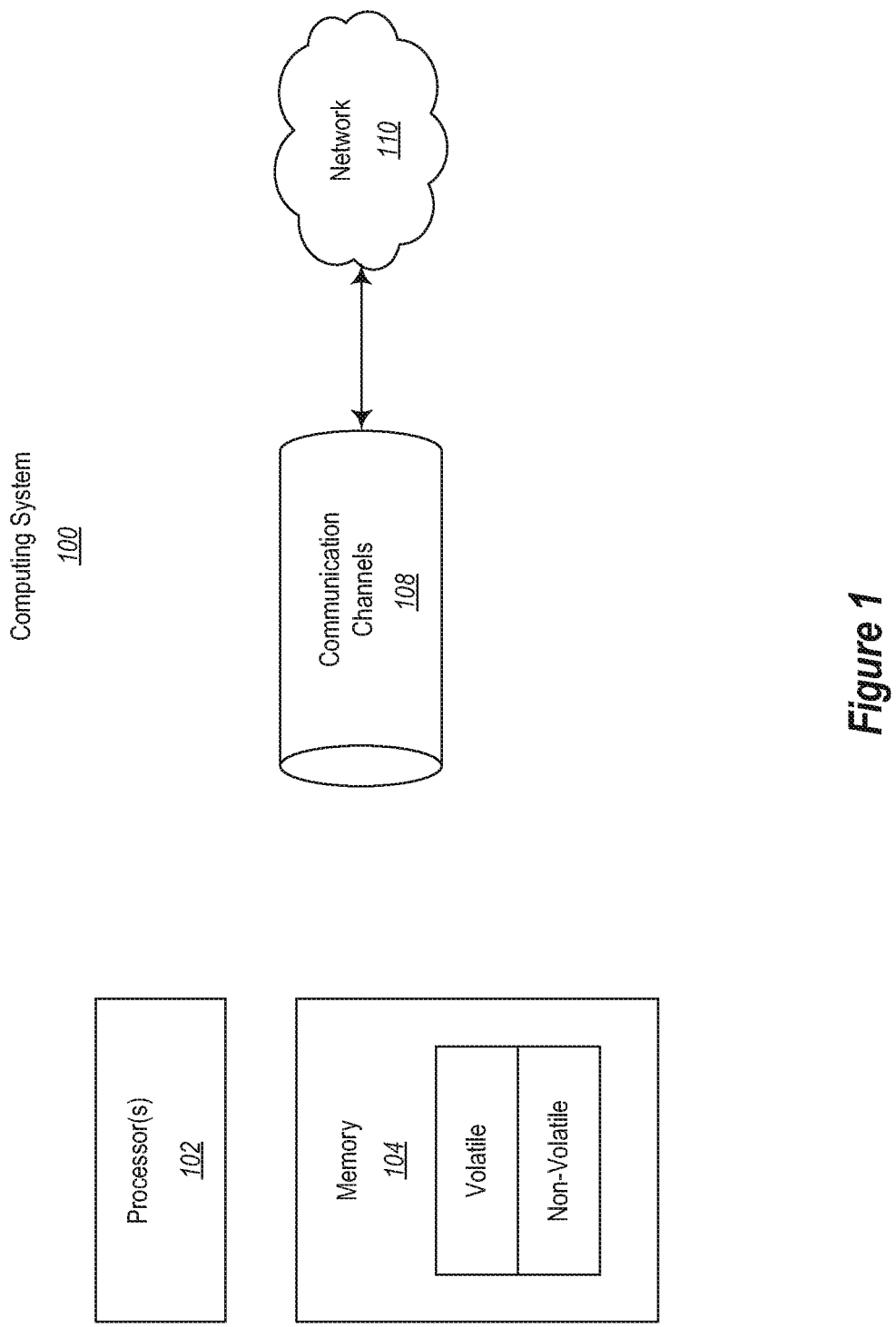
FIG. 1 illustrates a computing system in which some embodiments described herein may be employed.

As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "module" or "component" can refer to software objects or routines that execute on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100. Computing system 100 may also contain communication channels 108 that allow the computing system 100 to communicate with other message processors over, for example, network 110.

Embodiments described herein may comprise or utilize a special purpose or general-purpose computer including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 2:
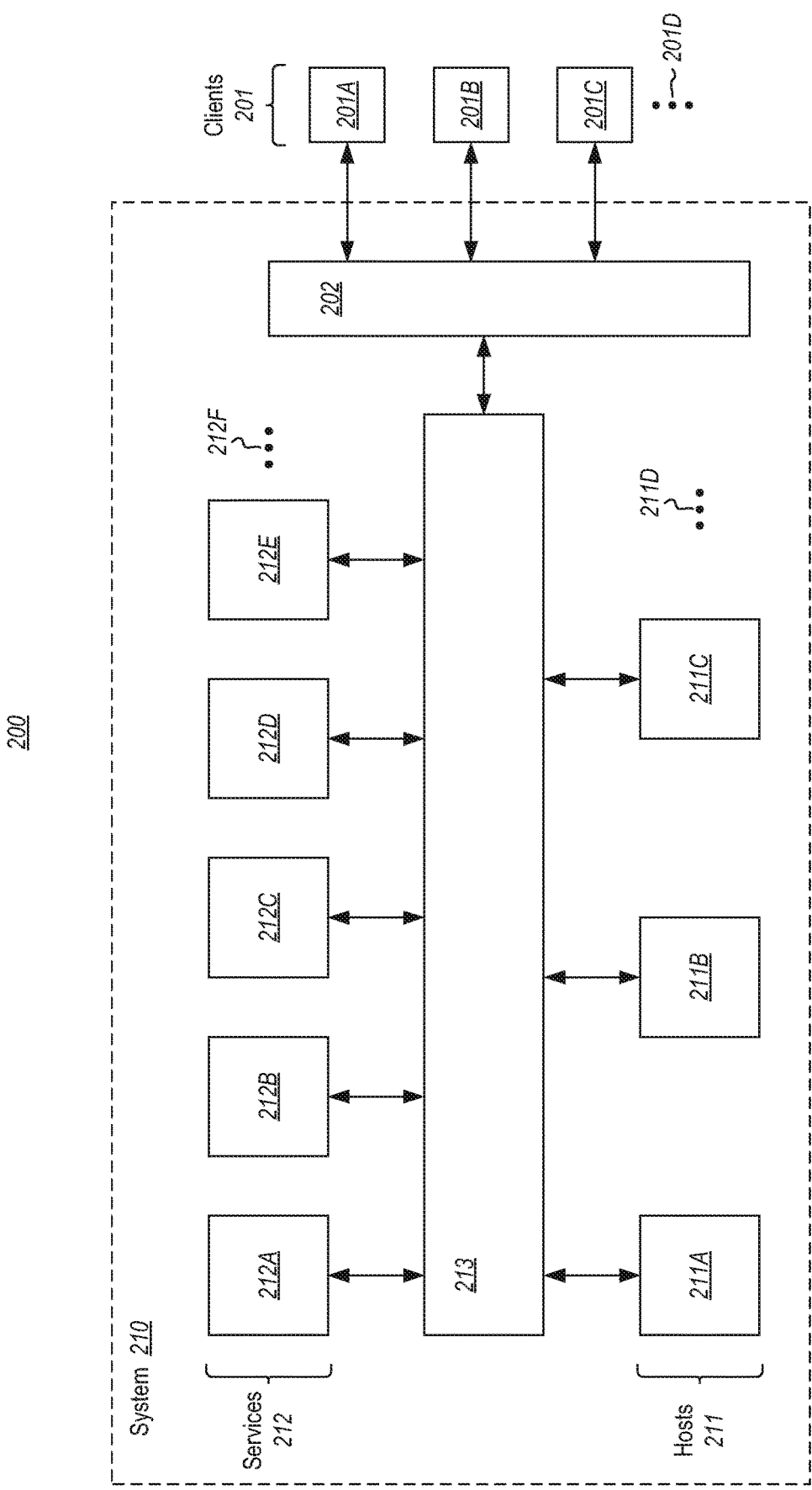
FIG. 2 abstractly illustrates an environment in which the principles described herein may be employed including a service coordination system communicating with multiple hosts, multiple services, and through an interface with clients.

FIG. 2 abstractly illustrates an environment 200 in which the principles described herein may be employed. The environment 200 includes multiple clients 210 interacting with a system 210 using an interface 202. The environment 200 is illustrated as having three clients 201A, 201B and 201C, although the ellipses 201D represents that the principles described herein are not limited to the number of clients interfacing with the system 210 through the interface 202. The system 210 may provide services to the clients 201 on-demand and thus the number of clients 201 receiving services from the system 210 may vary over time.

Each client 201 may, for example, be structured as described above for the computing system 100 of FIG. 1.

Alternatively or in addition, the client may be an application or other software module that interfaces with the system 210 through the interface 202. The interface 202 may be an application program interface that is defined in such a way that any computing system or software entity that is capable of using the application program interface may communicate with the system 210.

The system 210 may be a distributed system, although not required. In one embodiment, the system 210 is a cloud computing environment. Cloud computing environments may be distributed, although not required, and may even be distributed internationally and/or have components possessed across multiple organizations.

In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For instance, cloud computing is currently employed in the marketplace so as to offer ubiquitous and convenient on-demand access to the shared pool of configurable computing resources. Furthermore, the shared pool of configurable computing resources can be rapidly provisioned via virtualization and released with low management effort or service provider interaction, and then scaled accordingly.

A cloud computing model can be composed of various characteristics such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth. In this description and in the claims, a "cloud computing environment" is an environment in which cloud computing is employed.

The system 210 includes multiple hosts 211, that are each capable of running virtual machines. Although the system 200 might include any number of hosts 211, there are three hosts 211A, 211B and 211C illustrated in FIG. 2, with the ellipses 211D representing that the principles described herein are not limited to the exact number of hosts that are within the system 210. There may be as few as one, with no upper limit. Furthermore, the number of hosts may be static, or might dynamically change over time as new hosts are added to the system 210, or as hosts are dropped from the system 210. Each of the hosts 211 may be structured as described above for the computing system 100 of FIG. 1.

Figure 3:
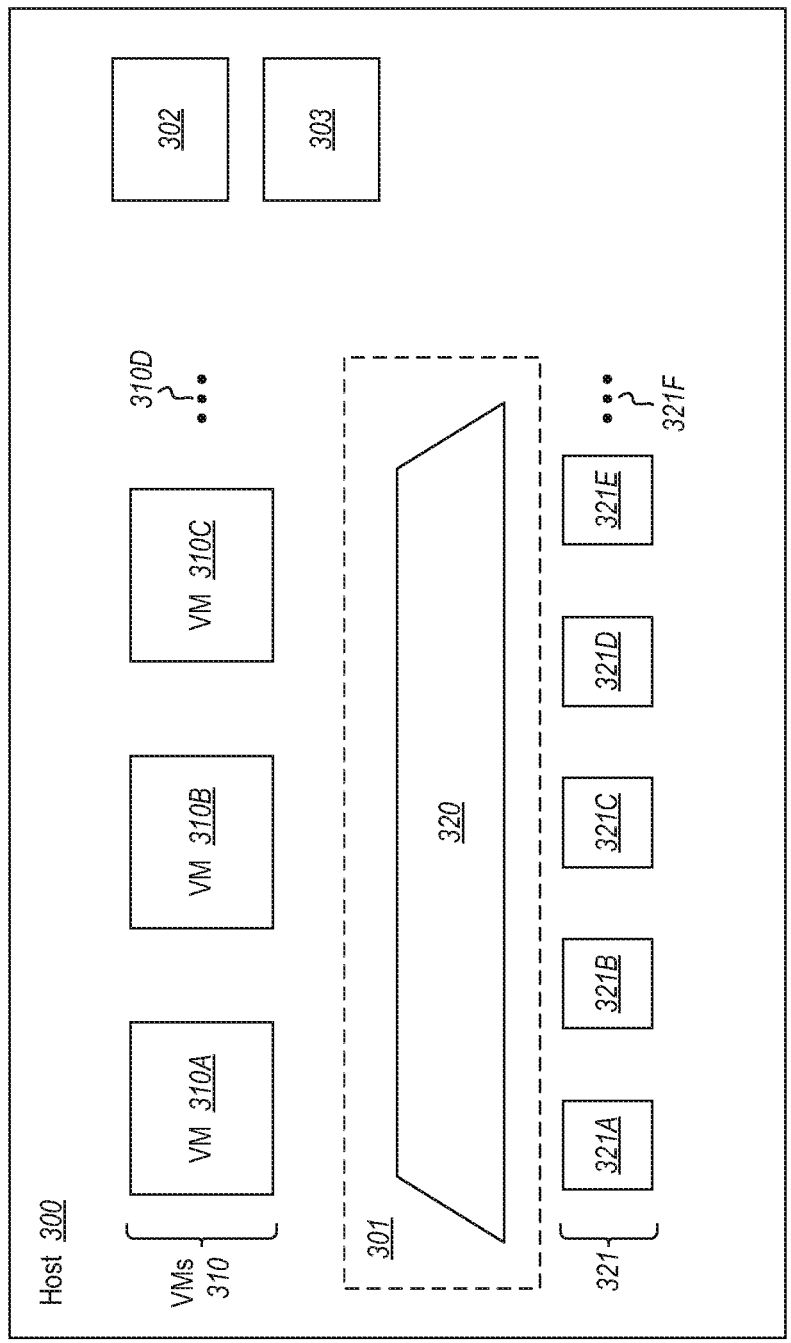
FIG. 3 abstractly illustrates a host that runs virtual machines, and in which physical resources are utilized via a hypervisor that abstracts the physical resources from the virtual machines, and instead presents virtual resources for the virtual machines.

Each host is capable of running one or more, and potentially many, virtual machines. For instance, FIG. 3 abstractly illustrates a host 300 in further detail. As an example, the host 300 might represent any of the hosts 211 of FIG. 2. In the case of FIG. 3, the host 300 is illustrated as operating three virtual machines 310 including virtual machines 310A, 310B and 310C. However, the ellipses 310D once again represents that the principles described herein are not limited to the number of virtual machines running on the host 300. There may be as few as zero virtual machines running on the host with the only upper limit being defined by the physical capabilities of the host 300.

During operation, the virtual machines emulates a fully operational computing system including an at least an operating system, and perhaps one or more other applications as well. Each virtual machine is assigned to a particular client, and is responsible to support the desktop environment for that client.

The virtual machine generates a desktop image or other rendering instructions that represent a current state of the desktop, and then transmits the image or instructions to the client for rendering of the desktop. For instance, referring to FIGS. 2 and 3, suppose that the host 300 of FIG. 3 represents the host 211A of FIG. 2, and that the virtual machine 310A is assigned to client 201A (referred to herein as "the primary example"), the virtual machine 310A might generate the desktop image or instructions and dispatch such instructions to the corresponding client 201A from the host 211A via a service coordination system 213 and via the system interface 202.

As the user interacts with the desktop at the client, the user inputs are transmitted from the client to the virtual machine. For instance, in the primary example and referring to FIGS. 2 and 3, the user of the client 201A interacts with the desktop, and the user inputs are transmitted from the client 201 to the virtual machine 310A via the interface 201, via the service coordination system 213 and via the host 211A.

The virtual machine processes the user inputs and, if appropriate, changes the desktop state. If such change in desktop state is to cause a change in the rendered desktop, then the virtual machine alters the image or rendering instructions, if appropriate, and transmits the altered image or rendered instructions to the client computing system for appropriate rendering. From the prospective of the user, it is as though the client computing system is itself performing the desktop processing.

The host 300 includes a hypervisor 320 that emulates virtual resources for the virtual machines 310 using physical resources 321 that are abstracted from view of the virtual machines 310. The hypervisor 321 also provides proper isolation between the virtual machines 310. Thus, from the perspective of any given virtual machine, the hypervisor 320 provides the illusion that the virtual machine is interfacing with a physical resource, even though the virtual machine only interfaces with the appearance (e.g., a virtual resource) of a physical resource, and not with a physical resource directly. In FIG. 3, the physical resources 321 are abstractly represented as including resources 321A through 321F. Examples of physical resources 321 including processing capacity, memory, disk space, network bandwidth, media drives, and so forth.

The host 300 may operate a host agent 302 that monitors the performance of the host, and performs other operations that manage the host. Furthermore, the host 300 may include other components 303. One example of such an other component 303 is a middleware enforcement mechanism.

Figure 4:
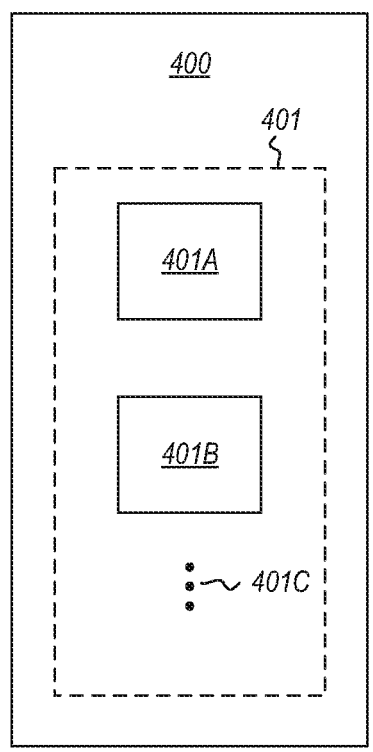
FIG. 4 abstractly illustrates components of a middleware enforcement mechanism that is configured to apply one or more middleware functions for network traffic corresponding to at least some of the virtual machines running on a host.

FIG. 4 abstractly illustrates components of a middleware enforcement mechanism 400 that is configured to apply one or more middleware function 401 for network traffic corresponding to at least some of the virtual machines running on a corresponding host. For instance, the middleware enforcement mechanism 400 is illustrated as applying two middleware functions 401A and 401B, although the ellipses 401C represents that the principles described herein are not limited to the number of middleware functions applied to network traffic. Examples of middleware functions will be described in further detail below. However, broadly speaking a middleware function is a function that performs a conditional filtering operation or a conditional transformation operation on network traffic. The middleware environment mechanism 400 may represent multiple components that are capable of enforcing a subset of the middleware functions. For instance, one component might enforce middleware function 401A, whereas another might enforce middleware function 401B. In some embodiments, the middleware enforcement mechanism 400 may operate on a host 211. For instance, the middleware enforcement mechanism 400 may operate on the same host as the target virtual machine that the network traffic is directed to. Alternatively, or in addition, some or all of the middleware enforcement mechanism 400 may operate on a different host 211 than the host that runs the target virtual machine. Alternatively or in addition, some or all of the middleware enforcement mechanism 400 may operate outside of any host 211 (such as in the service coordination system 213 and/or in one or more of the services 212).

Referring back to FIG. 2, the system 200 also includes services 212. In the illustrated example, the services 200 include five distinct services 212A, 212B, 212C, 212D and 212E, although the ellipses 212F represents that the principles described herein are not limited to the number of service in the system 210. A service coordination system 213 communicates with the hosts 211 and with the services 212 to thereby provide services requested by the clients 201, and other services (such as authentication, billing, and so forth) that may be prerequisites for the requested service.

Figure 5:
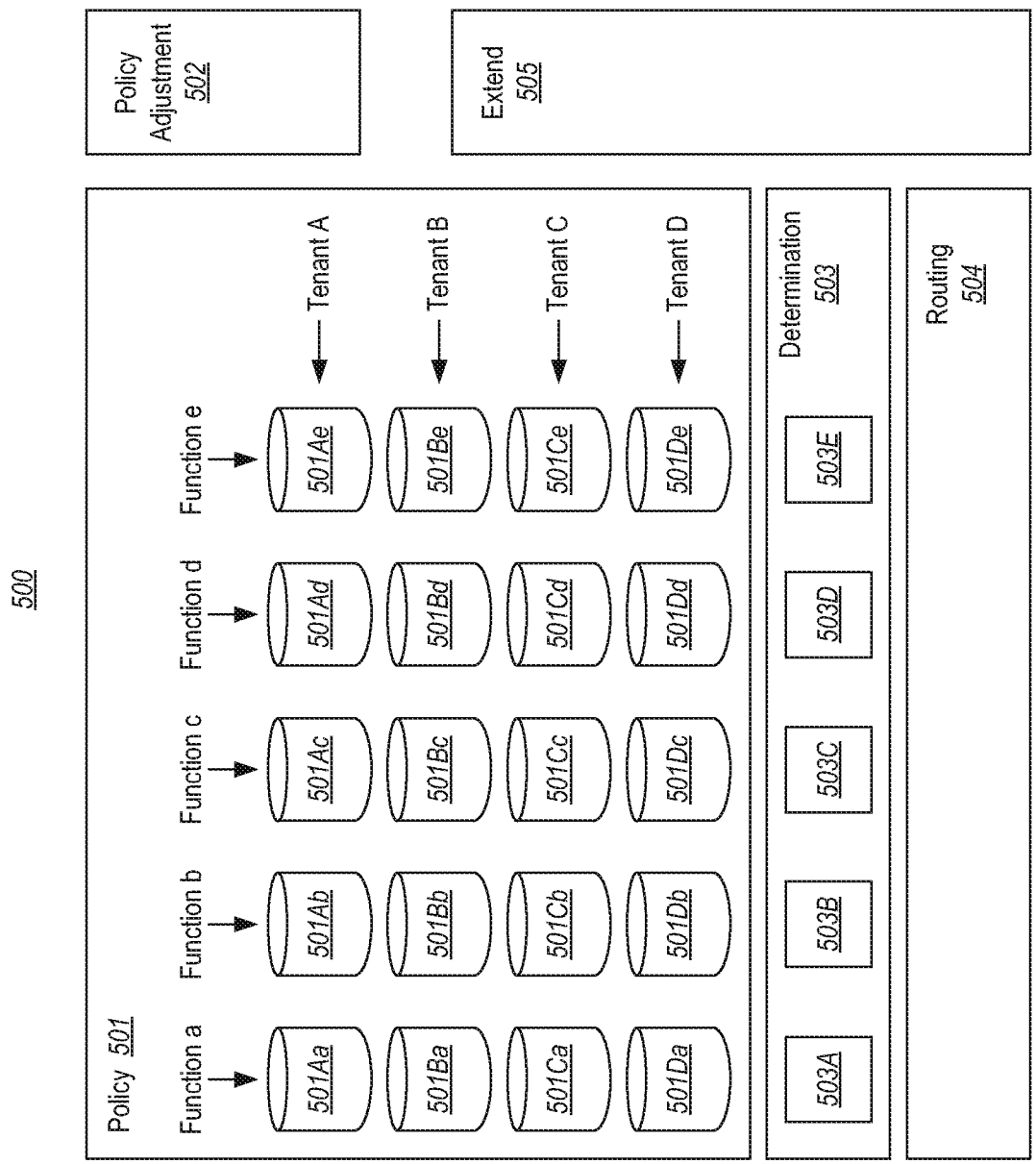
FIG. 5 illustrates a middleware management service that may represent one of the services illustrated in FIG. 2, and which manages middleware function policy.

FIG. 5 illustrates a middleware management service 500 that may represent one of the services 212 illustrated in FIG. 2. The middleware management service 500 is configured to maintain per-tenant middleware policy for each of multiple tenants, and for each of potentially multiple middleware functions. Accordingly, FIG. 5 illustrates middleware policy component 501 in which the policy is represented as a two dimensional grid with tenants on the vertical dimension, and middleware function on the horizontal dimension. The policy has identifying nomenclature 501Xy, where X is an identifier (A through D for the tenant), and y is an identifier (a through e) for the middleware function. Of course, the policy may be represented in any fashion, not just a two dimensional grid. The grid is provided only for ease in visualizing the per-tenant and per-function representation of the middleware policy to the reader.

The middleware function may be any function that applies conditional filtering or conditional transformation to the network traffic for the associated tenant. As examples only, the middleware function could including the following:

1) a firewall function that filters incoming traffic and does not allow certain traffic types to reach the virtual machine and/or that filters outgoing traffic and does not allow the virtual machine to dispatch certain traffic types;
2) an antivirus function that performs an antivirus checks of certain types of outgoing or incoming network traffic;
3) a demilitarized zone function that executes certain types of network traffic is a sandboxed environment to identify what the execution causes to have happen, and filters the network traffic depending on the effects;
4) an encryption and/or decryption function that encrypts outgoing network traffic and/or decrypts incoming network traffic;
5) a compression and/or decompression function that compresses outgoing network traffic and/or decompresses incoming network traffic, and so forth.

For each middleware function, and for each tenant, the middleware policy 501 thus includes a policy. Note that these policies may have default settings that are expressed within the policy, or else inferred based on the absence of information, or the like. Furthermore, the policy itself may be the product of a function that receives various inputs. For instance, a policy 501Aa might specific for tenant A and function a, that outgoing network traffic of a certain type is to be compressed, but only during certain times, and only if the host resource usage is below a certain level, and only if network bandwidth usage of the host is above a certain level.

Note that policy 501 supports five middleware functions labeled abstractly as functions a through e. However, the policy 501 may support any number of functions from one to many. The supported functions may be pre-defined functions that are part of a library of middleware functions offered by default by the middleware management service 200. Furthermore, one, some or all of the policies need not be applied to all tenants. For instance, suppose that tenant A has no associated firewall function (e.g., function a), and thus there is no associated policy 501Aa for tenant A and function a. As another example, suppose that tenant B has no associated antivirus function (e.g., function c), and thus there is no associated policy 501Bc for tenant B and function c. Note also that policy 501 supports four tenants labeled abstractly as functions A through D. However, the policy 501 may support any number of tenants from one to many.

The middleware management service 500 also includes a policy adjustment component 502 that permits the per-tenant middleware policy 501 to be changed. As an example, referring to FIG. 2, a client having proper credentials could change one or more components of the policy 501. The scope of the authority to change the credentials may be limited to the policy corresponding to a certain tenant or group or tenants, or to a middleware function, or to a group of middleware functions, or may be limited in other ways.

A policy determination component 503 determines policy to apply to network traffic dependent on a virtual machine corresponding to the network traffic, and dependent on a tenant that is assigned to the virtual machine; and dependent on the middleware function. In FIG. 5, there is a plurality of such determination components 503A through 503E each corresponding to the middleware functions a through e. A routing component 504 cause the network traffic to be routed such that the determined policy is applied to the network traffic using middleware. For instance, the routing component 504 may route the network traffic to the middleware enforcement mechanism 400 of FIG. 4.

Figure 6:
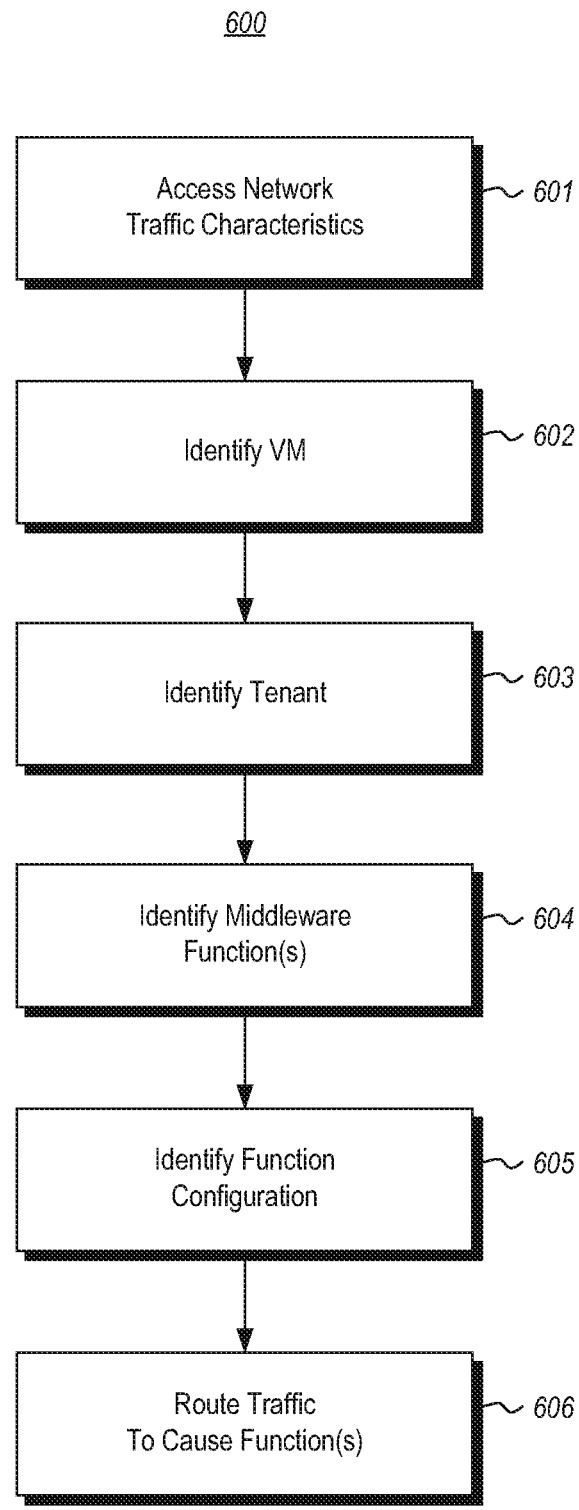
FIG. 6 illustrates a flowchart of a method for the middleware management component operating to perform a per-tenant middleware function on a network traffic item.

FIG. 6 illustrates a flowchart of a method 600 for the middleware management service operating to perform a per-tenant middleware function on network traffic item. The method 600 may be performed by, for example, the middleware management service 500 of FIG. 5. Accordingly, the method 600 of FIG. 6 will be described with frequent reference to the middleware management service 500 of FIG. 5.

The middleware management service 500 accesses one or more characteristics of an item of network traffic (act 601). Such characteristics might include, for example only, whether the network traffic is incoming or outgoing, is of a certain size, is transmitted according to a certain protocol, has a certain content, and so forth. Such characteristics may be provided by, for example, the service coordination system 213. The middleware management service 500 identifies the virtual machine corresponding to the network traffic (act 602) (e.g., to which the network traffic is destined if incoming network traffic, or from which the network traffic originated if outgoing network traffic). This information might have been determined by the service coordination system 213 and provided to the middleware management service 500, and/or the middleware management service 500 might have determined the virtual machine identity based on the network traffic characteristics.

The middleware management service 500 then determines what tenant is assigned to the virtual machine (act 603). Based on the tenant identity, the determination component 503 may refer to the middleware policy 501 in order to identify the middleware function(s) to apply to the network traffic (act 604), and to identify the corresponding configuration to apply to those middleware functions (act 605). The routing component 504 may then be employed to route the network traffic (act 606) in such a manner that causes the properly configured middleware function to be applied to the network traffic. For instance, the routing component may cause the network traffic to be routed to the middleware enforcement component 400 that is responsible for applying the identified middleware for the target virtual machine. The network traffic may include instructions for the middleware enforcement component regarding which middleware functions are to be applied, in what order, and with what configuration.

For instance, in the primary example, the middleware management service might receive characteristics of network traffic, and determine that the network traffic corresponds to virtual machine 310A in the host 300 of FIG. 3 (which is the host 210 in the primary example). The middleware management service might then refer to the policy 501 to determine that function 401A and 401B is to be performed. Then, the middleware management service might dispatch the network traffic to the middleware enforcement component 400 that is to apply the middleware functions 401A and 401B on behalf of the target virtual machine, with configuration that causes the middleware enforcement component 400 to perform the functions 401A and 401B.

Referring again to FIG. 5, the middleware management service 500 may have an extensibility mechanism 505 for adding a middleware service or function to the available middleware functions served by the middleware management service 500. Thus, third party middleware functions may be added to the middleware management service 500. For instance, suppose that a new middleware function f is to be added, the extensibility mechanism 505 may include an application program interface that permits the service coordination system 213 to cause additional policy to be populated to support the function f for one or more tenants. Additionally, a middleware determination function may be added to handle the configuration determination for this new function.

Referring back to FIG. 3, recall that in one embodiment, the host itself has a middleware enforcement mechanism that is an example of the other component 303 of FIG. 3, and which is abstractly illustrated as middleware enforcement mechanism 400 in FIG. 4. There are a variety of ways that this middleware enforcement mechanism 400 could be implemented on the host. In one example, the middleware enforcement mechanism is a specialized virtual machine running on the particular host, and that operates to perform middleware functions for the other virtual machines. Since all virtual machines are operated in a safe environment and are prevented from harming the host using the host operating system, this is a safer way to allow third parties to add middleware functions while reducing risk of harm to the host. Another may is to have the middleware enforcement mechanism act as part of the host operating system. However, recall that the some or all of the middleware enforcement mechanism 400 may reside in a different host than the target virtual machine, and/or perhaps external to any of the hosts.

Accordingly, the principles described herein allow middleware functions to be flexibly incorporated into a system such as a cloud computing environment, while potentially allowing third parties to add custom middleware functions to the cloud.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system comprising:
one or more processor(s); and
one or more computer-readable hardware storage device(s) having stored thereon computer-executable instructions that are executable by the one or more processor(s) to apply a middleware function to network traffic by at least:
identifying one or more characteristic(s) of the network traffic;
based on the one or more characteristic(s), determining an identity of a computing entity associated with the network traffic;
identifying a middleware policy associated with the computing entity; and
selecting a middleware function to apply to the network traffic based on the identified middleware policy, wherein, prior to the selected middleware function being applied to the network traffic, the selected middleware function is configured based on the middleware policy.

2. The computing system of claim 1, wherein the computing entity is a virtual machine performing operations for a tenant.

3. The computing system of claim 1, wherein the selected middleware function performs a conditional filtering operation on the network traffic.

4. The computing system of claim 1, wherein the selected middleware function performs a conditional transformation on the network traffic.

5. The computing system of claim 1, wherein the selected middleware function is a firewall function.

6. The computing system of claim 1, wherein the selected middleware function is an antivirus function.

7. The computing system of claim 1, wherein the selected middleware function is a demilitarized zone function.

8. The computing system of claim 7, wherein the demilitarized zone function executes in a sandboxed environment.

9. The computing system of claim 1, wherein the selected middleware function is either an encryption function or a decryption function.

10. The computing system of claim 1, wherein the selected middleware function is either a compression function or a decompression function.

11. A method for applying a middleware function to network traffic passing through a communications network, the method comprising:
identifying one or more characteristic(s) of the network traffic;
based on the one or more characteristic(s), determining an identity of a computing entity associated with the network traffic;
identifying a middleware policy associated with the computing entity; and
selecting a middleware function to apply to the network traffic based on the identified middleware policy, wherein, prior to the selected middleware function being applied to the network traffic, the selected middleware function is configured based on the middleware policy.

12. The method of claim 11, wherein the middleware policy is a product of a separate middleware function.

13. The method of claim 11, wherein the network traffic is incoming traffic.

14. The method of claim 11, wherein the network traffic is outgoing traffic.

15. The method of claim 11, wherein identifying the one or more characteristic(s) of the network traffic includes identifying a size of the network traffic.

16. The method of claim 11, wherein identifying the one or more characteristic(s) of the network traffic includes identifying a transmission protocol of the network traffic.

17. The method of claim 11, wherein identifying the one or more characteristic(s) of the network traffic includes identifying a virtual machine from which the network traffic originated.

18. The method of claim 11, wherein identifying the one or more characteristic(s) of the network traffic includes identifying a virtual machine to which the network traffic is destined.

19. The method of claim 11, wherein the network traffic includes instructions regarding which middleware functions are to be applied to the network traffic, the selected middleware function being one of the middleware functions.

20. One or more hardware storage device(s) having stored thereon computer-executable instructions that are executable by one or more processor(s) to apply a middleware function to network traffic by at least:
- identifying one or more characteristic(s) of the network traffic;
- based on the one or more characteristic(s), determining an identity of a computing entity associated with the network traffic;
- identifying a middleware policy associated with the computing entity; and
- selecting a middleware function to apply to the network traffic based on the identified middleware policy, wherein, prior to the selected middleware function being applied to the network traffic, the selected middleware function is configured based on the middleware policy.

\* \* \* \* \*